US011378878B2

(12) United States Patent
Nakamura

(10) Patent No.: US 11,378,878 B2
(45) Date of Patent: Jul. 5, 2022

(54) PROJECTOR

(71) Applicant: SEIKO EPSON CORPORATION, Tokyo (JP)

(72) Inventor: Norio Nakamura, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/030,704

(22) Filed: Sep. 24, 2020

(65) Prior Publication Data

US 2021/0088888 A1    Mar. 25, 2021

(30) Foreign Application Priority Data

Sep. 24, 2019  (JP) .............................. JP2019-173544

(51) Int. Cl.
*G03B 21/20* (2006.01)
*G02F 1/1335* (2006.01)
*G03B 21/00* (2006.01)

(52) U.S. Cl.
CPC ..... *G03B 21/208* (2013.01); *G02F 1/133512* (2013.01); *G03B 21/006* (2013.01); *G02F 2203/12* (2013.01)

(58) Field of Classification Search
CPC ................ G03B 21/208; G03B 21/006; G02F 1/133512; G02F 2203/12
USPC ......................................................... 353/97
See application file for complete search history.

(56) References Cited

U.S. PATENT DOCUMENTS

| 5,161,042 A | 11/1992 | Hamada |
| 6,466,285 B1 | 10/2002 | Ichikawa |
| 2008/0266527 A1* | 10/2008 | Fuse .................... G03B 21/005 353/38 |
| 2016/0286180 A1* | 9/2016 | Otani .................. G03B 21/005 |

FOREIGN PATENT DOCUMENTS

| JP | H4-60538 A | 2/1992 |
| JP | 2000-356781 A | 12/2000 |

* cited by examiner

*Primary Examiner* — Jerry L Brooks
(74) *Attorney, Agent, or Firm* — Dority & Manning, P.A.

(57) ABSTRACT

A projector according to the present disclosure includes an illuminator that outputs light, a light modulator including a liquid crystal panel that modulates the light from the illuminator in accordance with image information, and a projection optical apparatus that projects image light modulated by the light modulator. The liquid crystal panel includes a display unit on which the light from the illuminator is incident, a light blocking film having a light transmissive area provided in correspondence with the display unit, and a lens that collects the light into a spot in the light transmissive area. The display unit has a first area and a second area in the light transmissive area, the second area providing light transmittance higher than light transmittance provided by the first area. The illuminator outputs the light in such a way, that the lens collects the light into a spot in the second area.

6 Claims, 10 Drawing Sheets

PROJECTOR

The present application is based on, and claims priority from JP Application Serial Number 2019-173544, filed Sep. 24, 2019, the disclosure of which is hereby incorporated by reference herein in its entirety.

BACKGROUND

1. Technical Field

The present disclosure relates to a projector.

2. Related Art

There has been a known projector including one liquid crystal panel as a light modulation device or what is called a single-panel projector. For example, JP-A-4-60538 discloses a projection-type color liquid crystal display apparatus that produces a color image by using a microlens array to allocate different color light fluxes to different color sub-pixels of the liquid crystal panel and modulating the color light fluxes at the sub-pixels.

A projector using a spatially separate color liquid crystal panel including no color filter has been studied, as described in JP-A-4-60538. A light modulator using a liquid crystal panel, however, has a problem of a decrease in light transmittance in part of the area of each of the sub-pixels due to disclination and hence a decrease in the brightness of an image. Disclination is a phenomenon in which a potential difference between adjacent sub-pixels of a liquid crystal panel causes electric field disturbance and the state of the orientation of the liquid crystal molecules is also disturbed in association with the electric field disturbance, resulting in deviation from an intrinsically intended orientation state.

The aforementioned problem has been described with reference to a single-panel projector including a spatially separate liquid crystal panel and is common to a projector including three liquid crystal panels that modulate blue light, green light, and red light.

SUMMARY

A projector according to an aspect of the present disclosure includes an illuminator that outputs light, a light modulator including a liquid crystal panel that modulates the light from the illuminator in accordance with image information, and a projection optical apparatus that projects image light modulated by the light modulator. The liquid crystal panel includes a display unit on which the light from the illuminator is incident, a light blocking film having a light transmissive area provided in correspondence with the display unit, and a lens that collects the light into a spot in the light transmissive area. The display unit has a first area and a second area in the light transmissive area, the second area providing light transmittance higher than light transmittance provided by the first area. The illuminator outputs the light in such a way that the lens collects the light into a spot in the second area.

In the projector according to the aspect of the present disclosure, the liquid crystal panel may have as the display unit at least a first display unit on which first light that belongs to a first wavelength band is incident and a second display unit which is so disposed as to be adjacent to the first display unit and on which second light that belongs to a second wavelength band different from the first wavelength band is incident. The light blocking film may have as the light transmissive area at least a first light transmissive area provided in correspondence with the first display unit and a second light transmissive area provided in correspondence with the second display unit. The lens may collect the first light incident in a predetermined direction into a spot in the second area in the first light transmissive area and the second light incident in a direction different from the direction in which the first light is incident into a spot in the second area in the second light transmissive area.

In the projector according to the aspect of the present disclosure, the second area in the first light transmissive area and the second area in the second light transmissive area may be located in the same position in the light transmissive areas to which the second areas correspond.

In the projector according to the aspect of the present disclosure, a pretilt direction of liquid crystal molecules in the liquid crystal panel may substantially coincide with a direction of a diagonal of the display unit having a rectangular shape when viewed in a direction of a normal to the liquid crystal panel, and the second area in each of the light transmissive areas may be located at one end of the diagonal.

In the projector according to the aspect of the present disclosure, the illuminator may include a light source apparatus, a first lens array on which light from the light source apparatus is incident, a second lens array on which light from the first lens array is incident, and a superimposing lens on which light from the second lens array is incident, and a center of an illumination light flux incident on the superimposing lens may be shifted from an optical axis of the superimposing lens.

In the projector according to the aspect of the present disclosure, an optical axis of the light source apparatus may be shifted from the optical axis of the superimposing lens.

In the projector according to the aspect of the present disclosure, an optical element that changes a position where or an angle at which the light is incident on the superimposing lens may be provided between the light source apparatus and the superimposing lens.

DESCRIPTION OF EXEMPLARY EMBODIMENTS

First Embodiment

A first embodiment of the present disclosure will be described below with reference to FIGS. 1 to 10.

Figure 1:
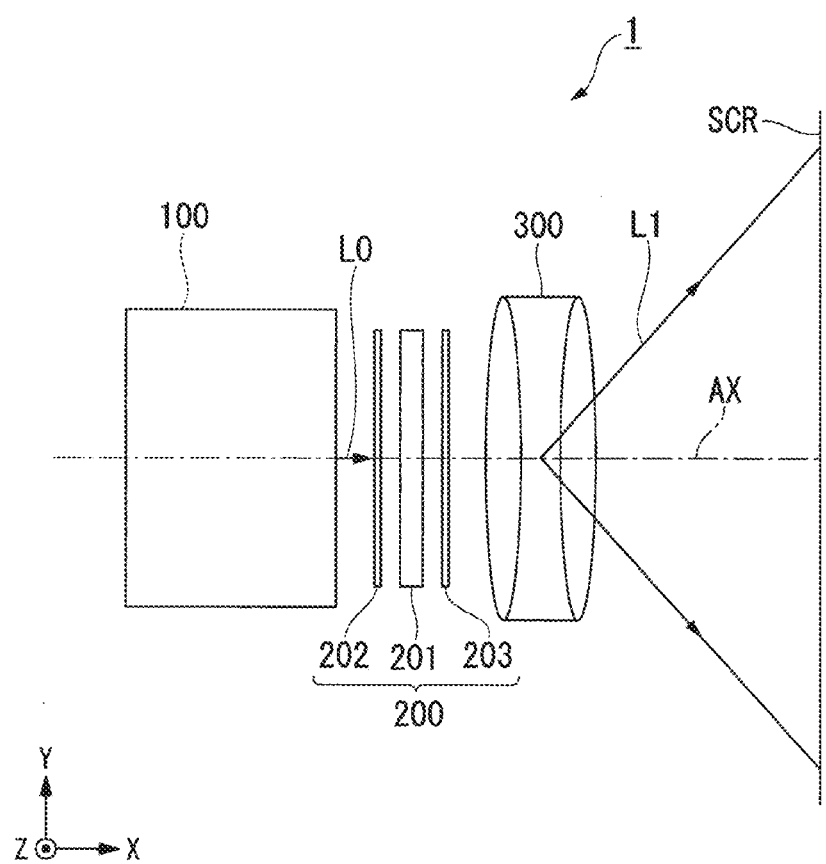
FIG. 1 is a schematic configuration diagram of a projector according to a first embodiment.

FIG. 1 is a schematic configuration diagram of a projector according to the first embodiment.

In the following drawings, components are drawn at different dimensional scales in some cases for clarity of each of the components.

A projector 1 includes an illuminator 100, a light modulator 200, and a projection optical apparatus 300, as shown in FIG. 1. In the projector 1, an axis along which the chief ray of illumination light L0 outputted from the illuminator 100 travels is defined as an optical axis AX. An XYZ orthogonal coordinate system is used as required in the following description. The axis Z is an axis along the upward/downward direction of the projector. The axis X is an axis parallel to the optical axis AX. The axis Y is an axis along the horizontal direction of the projector and perpendicular to the axes X and Z.

The light modulator 200 is a single-panel liquid crystal light modulator using a single-color liquid crystal display panel. That is, the light modulator 200 includes a liquid crystal panel 201, which modulates the light from the illuminator 100 in accordance with image information, a light-incident-side polarizer 202, and a light-exiting-side polarizer 203. As described above, employing a single-panel liquid crystal light modulator reduces the size of the projector 1. The light modulator 200 modulates the illumination light L0 from the illuminator 100 in accordance with image information to form image light L1.

The light-incident-side polarizer 202 is provided in the optical path of the illumination light L0 between the illuminator 100 and the liquid crystal panel 201. The light-exiting-side polarizer 203 is provided in the optical path of the image light L1 between the liquid crystal panel 201 and the projection optical apparatus 300. The light-incident-side polarizer 202 and the light-exiting-side polarizer 203 are so disposed that the polarization axis of the light-incident-side polarizer 202 is perpendicular to the polarization axis of the light-exiting-side polarizer 203.

The projection optical apparatus 300 is formed of projection lenses. The projection optical apparatus 300 enlarges the image light L1 modulated by the light modulator 200 and projects the enlarged image light L1 toward a screen SCR. The number of projection lenses that form the projection optical apparatus 300 is not limited a specific number, and the projection optical apparatus 300 may be formed of one projection lens or a plurality of projection lenses.

The configuration of the illuminator 100 will be described below.

Figure 2:
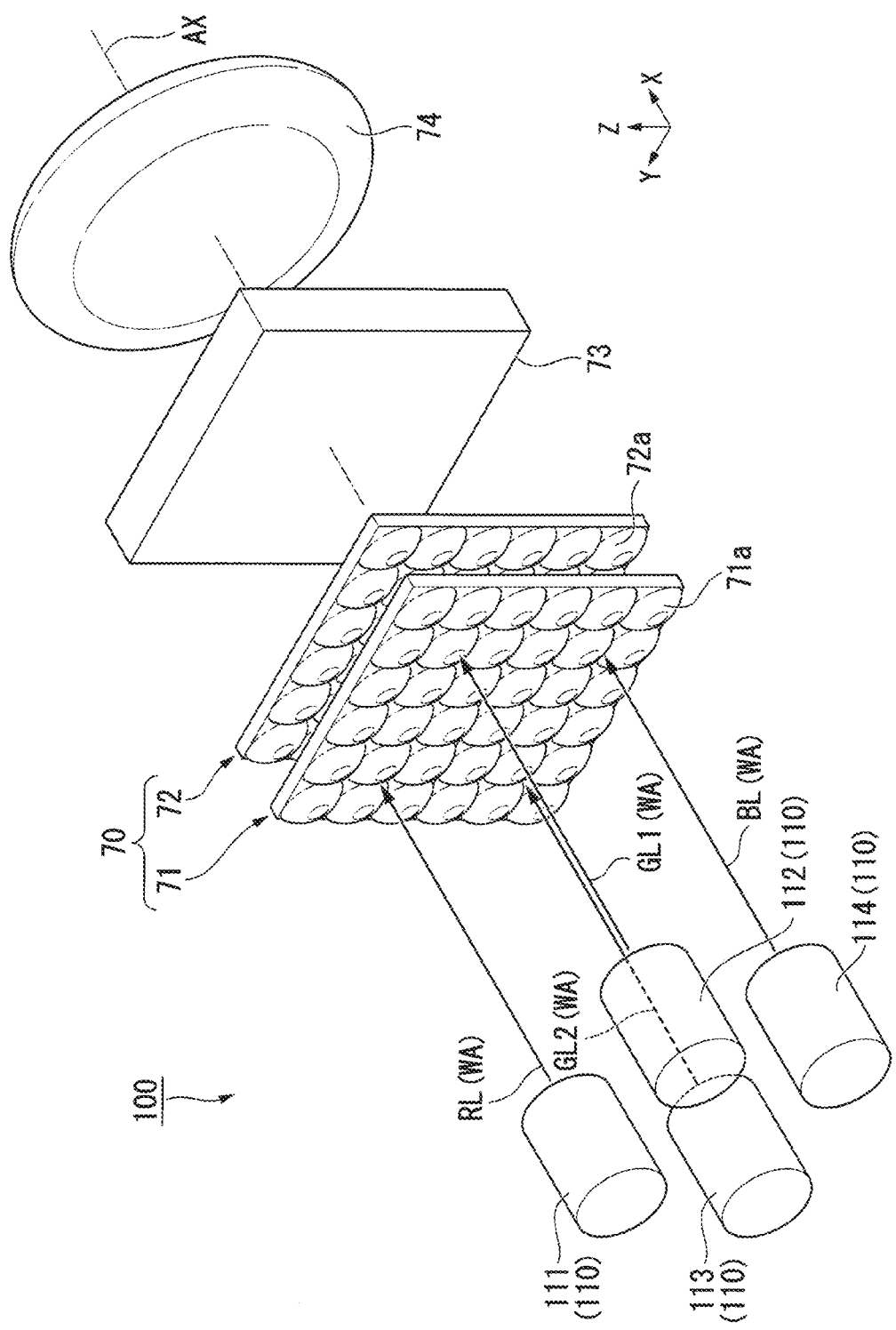
FIG. 2 is a perspective view of an illuminator.

FIG. 2 is a perspective view showing a schematic configuration of the illuminator 100.

The illuminator 100 includes a light source apparatus 110, a lens integrator unit 70, a polarization converter 73, and a superimposing lens 74, as shown in FIG. 2.

The light source apparatus 110 includes a first light source unit 111, a second light source unit 112, a third light source unit 113, and a fourth light source unit 114. The first light source unit 111 and the second light source unit 112 are disposed in the same position in the direction along the axis Z. The third light source unit 113 and the fourth light source unit 114 are disposed in the same position in the direction along the axis Z. The first light source unit 111 is located above the third light source unit 113 in the direction along the axis Z. The second light source unit 112 is located above the fourth light source unit 114 in the direction along the axis Z. That is, the light source apparatus 110 is formed of the four light source units 111, 112, 113, and 114 arranged in a matrix formed of two rows and two columns when viewed along the direction of the optical axis AX. The four light source units 111, 112, 113, and 114 may be mounted, for example, on a common substrate (not shown).

The first light source unit 111 includes a red light emitting diode (LED) light source (not shown) and a collimator lens (not shown). The red LED light source outputs red light RL (first light) that belongs to a wavelength band, for example, from 610 to 780 nm (first wavelength band). The collimator lens parallelizes the red light RL outputted from the red LED light source. The first light source unit 111 may include a laser light source in place of the LED light source.

The second light source unit 112 and the third light source unit 113 each include a green LED light source (not shown) and a collimator lens (not shown). The green LED light sources output green light GL1 and green light GL2 (second light) that belong to a wavelength band, for example, from 500 to 570 nm (second wavelength band). The collimator lenses parallelize the green light GL1 and the green light GL2 outputted from the green LED light sources. The second light source unit 112 and the third light source unit 113 may each include a laser light source in place of the LED light source.

The fourth light source unit 114 includes a blue LED light source (not shown) and a collimator lens (not shown). The blue LED light source outputs blue light BL (third light) that belongs to a wavelength band, for example, from 460 to 500 nm (third wavelength band). The collimator lens parallelizes the blue light BL outputted from the blue LED light source. The fourth light source unit 114 may include a laser light source in place of the LED light source.

The lens integrator unit 70 includes a first lens array 71 and a second lens array 72. Light having exited out of the first lens array 71 enters the second lens array 72. The first lens array 71 has a configuration in which a plurality of first lenses 71a are arranged in a matrix. The first lens array 71, specifically, the first lenses 71a divide a light ray flux WA having exited out of the four light source units 111, 112, 113, and 114 into a plurality of light fluxes and cause the divided light fluxes to enter the second lens array 72. The light flux WA is a light flux formed of the red light RL, the green light GL1, the green light GL2, and the blue light BL bundled into one light flux.

The second lens array 72 includes a plurality of second lenses 72a arranged in a matrix in correspondence with the first lenses 71a of the first lens array 71. In the present embodiment, the second lens array 72 along with the superimposing lens 74, which will be described later, superimposes images of the first lenses 71a of the first lens array 71 on one another and causes the superimposed image to enter the light modulator 200.

The polarization converter 73 has a configuration in which polarization separation films and half wave plates as retardation films are arranged in an array. The polarization converter 73 converts the light having exited out of the lens integrator unit 70 into light having a polarization direction, for example, parallel to the axis Z. The conversion allows the polarization direction of the light that enters the light modulator 200 to coincide with the transmission axis direction of the light-incident-side polarizer 202 disposed on the light incident side of the light modulator 200. Providing the polarization converter 73 causes the light-incident-side polarizer 202 to hardly absorb the light incident thereon, whereby the light use efficiency is improved.

The superimposing lens 74 is formed, for example, of a convex lens. The superimposing lens 74 superimposes the light fluxes having passed through the lens integrator unit 70 and the polarization converter 73 on one another and causes the superimposed light to enter the light modulator 200.

In the present embodiment, the color light beams RL, GL1, GL2, and BL in the light flux WA do not overlap with each other. The color light beams RL, GL1, GL2, and BL are therefore incident on different areas of the lens integrator unit 70. Having passed through the lens integrator unit 70 and the polarization converter 73, the color light beams RL, GL1, GL2, and BL still do not overlap with each other and enter the superimposing lens 74.

The light flux WA having passed through the lens integrator unit 70 and the polarization converter 73 is hereinafter referred to as an illumination light flux W. The illumination light flux W contains four illumination light beams, a red illumination light beam WR, a first green illumination light beam WG1, a second green illumination light beam WG2, and a blue illumination light beam WB. The red illumination light beam WR therefore corresponds to the red light RL having passed through the lens integrator unit and the polarization converter 73. The first green illumination light beam WG1 corresponds to the first green light GL1 having passed through the lens integrator unit 70 and the polarization converter 73. The second green illumination light beam WG2 corresponds to the second green light GL2 having passed through the lens integrator unit 70 and the polarization converter 73. The blue illumination light beam WB corresponds to the blue light BL having passed through the lens integrator unit 70 and the polarization converter 73.

Figure 3:
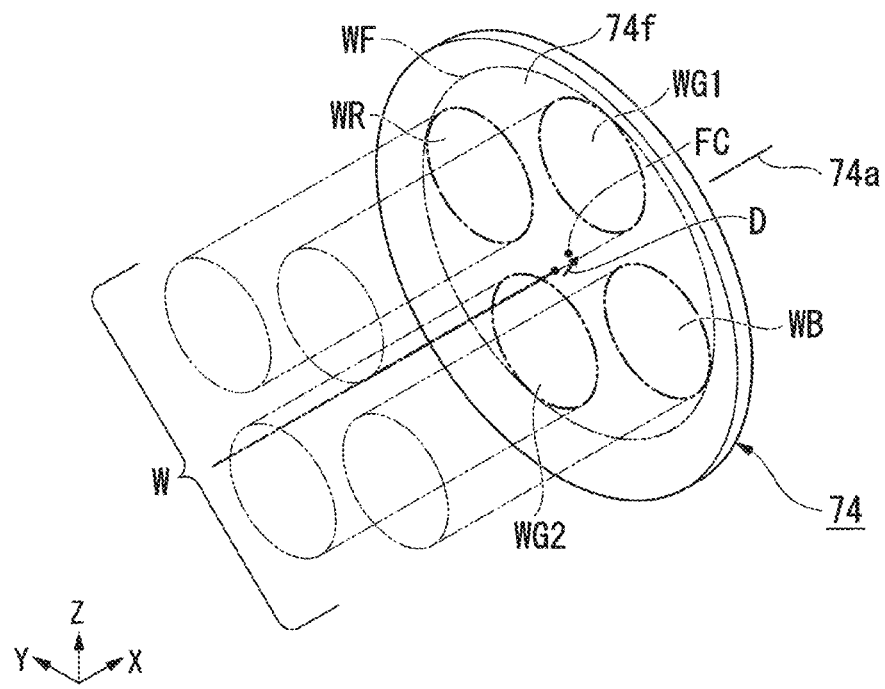
FIG. 3 is a perspective view showing light incident positions on a superimposing lens.

FIG. 3 is a perspective view showing the state of a light incident surface 74f of the superimposing lens 74.

In FIG. 3, the areas on which the red illumination light beam WR, the first green illumination light beam WG1, the second green illumination light beam WG2, and the blue illumination light beam WB are incident are each diagrammatically shown in the form of a two-dot-chain-line circle.

Also in the illumination light flux W, the red illumination light beam WR, the first green illumination light beam WG1, the second green illumination light beam WG2, and the blue illumination light beam WB do not overlap with each other. The red illumination light beam WR, the first green illumination light beam WG1, the second green illumination light beam WG2, and the blue illumination light beam WB are therefore incident on different locations of the light incident surface 74f of the superimposing lens 74, as shown in FIG. 3.

In FIG. 3, an imaginary circle WF, which circumscribes the four circles representing the areas on which the red illumination light beam WR, the first green illumination light beam WG1, the second green illumination light beam WG2, and the blue illumination light beam WB are incident, is assumed, and the center FC of the imaginary circle WF on the light incident surface 74f of the superimposing lens 74 is defined as the center of the illumination light flux W. In the present embodiment, the center FC of the illumination light flux W incident on the superimposing lens 74 is shifted in a predetermined direction labeled with the arrow D by a predetermined distance from the optical axis 74a of the superimposing lens 74. The "predetermined direction" and the "predetermined distance" used herein will be described later.

In the present embodiment, the superimposing lens 74 causes the directions in which the illumination light beams WR, WG1, WG2, and WB are incident on the light modulator 200 to differ from one another, in other words, the angles at which the illumination light beams WR, WG1, WG2, and WB are incident to differ from one another in accordance with the positions where the illumination light beams WR, WG1, WG2, and WE are incident on the light incident surface 74f of the superimposing lens 74. That is, the superimposing lens 74 causes the illumination light beams WR, WG1, WG2, and WE to enter the light modulator 200 in four directions different from one another.

The pixel structure of the liquid crystal panel 201 will be described below.

Figure 4:
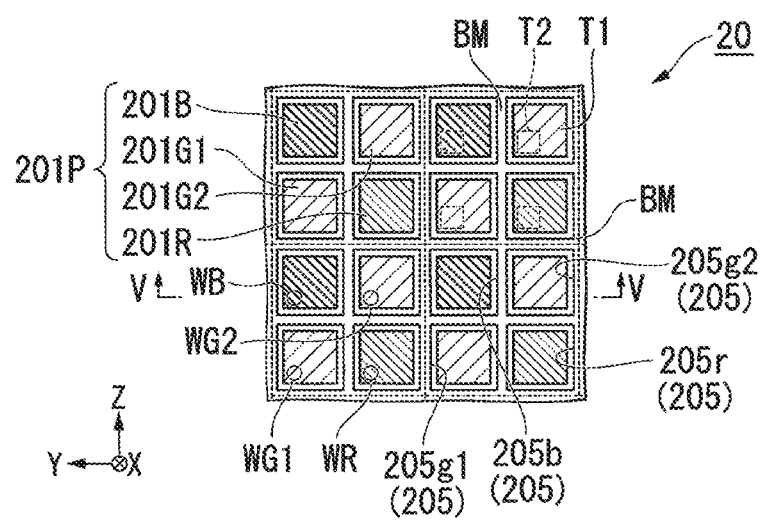
FIG. 4 is a diagrammatic view showing the arrangement of sub-pixels of a liquid crystal panel.

FIG. 4 is a plan view showing the pixel structure of the liquid crystal panel 201.

The liquid crystal panel 201 has a plurality of pixels 201P, as shown in FIG. 4. The plurality of pixels 201P are arranged in a matrix extending in the horizontal direction of a display screen, that is, in the direction Y, which is the rightward/leftward direction, and in the vertical direction of the display screen, that is, in the direction Z, which is the upward/downward direction.

The pixels 201P are each formed of a first sub-pixel 201R (first display unit), a second sub-pixel 201G1 (second display unit), a third sub-pixel 201G2, and a fourth sub-pixel 201B. The red illumination light beam WR is incident on the first sub-pixel 201R. The first green illumination light beam WG1 is incident on the second sub-pixel 201G1. The second green illumination light beam WG2 is incident on the third sub-pixel 201G2. The blue illumination light beam WE is incident on the fourth sub-pixel 201B.

The first sub-pixel 2018, the second sub-pixel 201G1, the third sub-pixel 201G2, and the fourth sub-pixel 201B are hereinafter also simply abbreviated to sub-pixels 201R, 201G1, 201G2, and 201B, respectively. Further, the sub-pixels 201R, 201G1, 201G2, and 201B in the present embodiment are each a minimum constituent unit that forms a display image and correspond to the display unit in the appended claims.

In each of the pixels 201P in the present embodiment, the first sub-pixel 201R and the second sub-pixel 201G1 are disposed in this order toward the positive side of the direction Y, the third sub-pixel 201G2 is disposed on the +Z-direction side of the first sub-pixel 201R, and the fourth sub-pixel 201B is disposed on the +Z-direction side of the second sub-pixel 201G1. That is, the liquid crystal panel 201 at least has, as the display unit, the first sub-pixels 201R, on which the red illumination light beam WR is incident, and the second sub-pixels 201G1, which are so disposed as to be adjacent to the first sub-pixels 201R and on which the first green illumination light beam WG1 is incident.

The liquid crystal panel 201 includes a black matrix BM (light blocking film), which will be described later. The black matrix BM has light transmissive areas 205r, 205g1, 205g2, and 205b provided in correspondence with the sub-pixels 201R, 201G1, 201G2, and 201B, respectively. That is, the sub-pixels 201P, 201G1, 201G2, and 201B are separated from each other by the black matrix BM. In the present embodiment, the light incident surface 74f of the superimposing lens 74 is optically conjugate with the black matrix BM of the liquid crystal panel 201.

Figure 5:
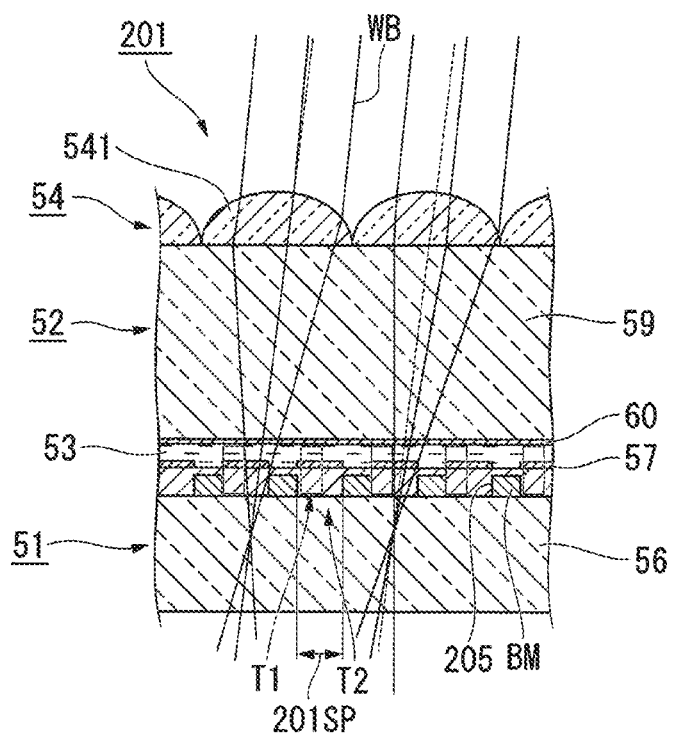
FIG. 5 is a cross-sectional view of the liquid crystal panel taken along the line V-V in FIG. 4.

FIG. 5 is a cross-sectional view of the liquid crystal panel 201 taken along the line V-V in FIG. 4. The four sub-pixels 201R, 201G1, 20162, and 201B have the same configuration. Therefore, the sub-pixels 201R, 201G1, 201G2, and 201B are collectively called sub-pixels 201SP, and the light transmissive areas 205r, 205g1, 205g2, and 205b are collectively called light transmissive areas 205 in FIG. 5.

The liquid crystal panel 201 includes a device substrate 51, a counter substrate 52, a liquid crystal layer 53, and a microlens array 54, as shown in FIG. 5. The device substrate 51 includes a translucent substrate 56, the black matrix BM, and first electrodes 57. The black matrix BM has the light transmissive area 205 in correspondence with the sub-pixels 201SP. That is, the liquid crystal panel 201 has the sub-pixels 201SP, on which the light from the illuminator 100 is incident. The sub-pixels 201SP are provided with the respective first electrodes 57. Although not shown the device substrate 51 has a circuit layer including thin-film transistors, data lines, scan lines, and other components for supplying the first electrodes 57 with voltage.

The counter substrate 52 includes a translucent substrate 59 and a second electrode 60. The second electrode is provided over all the sub-pixels 201SP.

The microlens array 54 is provided on the light incident side of the counter substrate 52. The microlens array 54 is formed of lenses 541, which are each provided in correspondence with a set of the four sub-pixels 201R, 201G1, 201G2, and 201B and collect the light into spots on the light transmissive areas 205. The microlens array 54 may be integrated with the counter substrate 52.

The liquid crystal layer 53 is sandwiched between the device substrate 51 and the counter substrate 52. The liquid crystal layer 53 is formed of liquid crystal molecules vertically oriented with a predetermined pretilt angle.

The present inventor has performed a simulation on the transmittance provided by each of the sub-pixels in a variety of drive voltage application patterns. FIGS. 7 to 10 show the results of the simulation.

Figure 7:
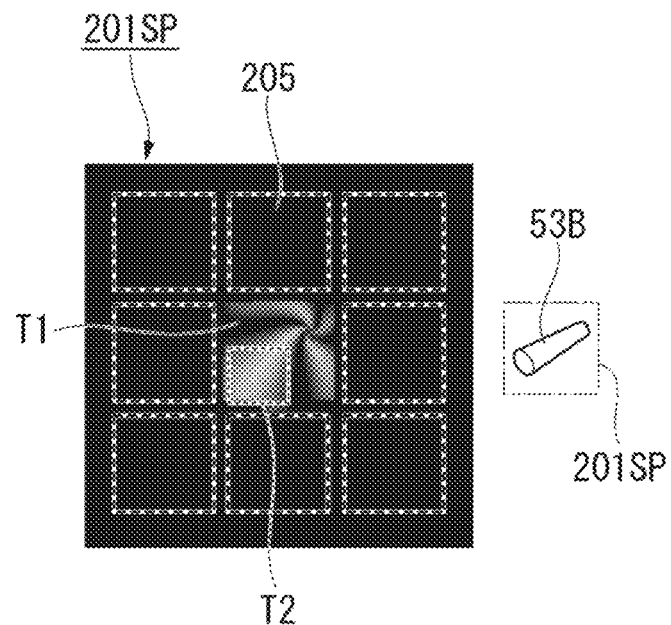
FIG. 7 shows the result of a transmittance simulation using a first voltage application pattern.
Figure 8:
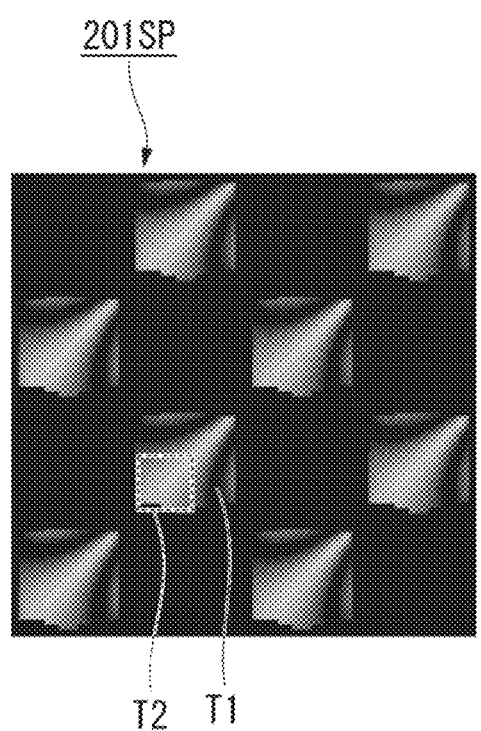
FIG. 8 shows the result of the transmittance simulation using a second voltage application pattern.
Figure 9:
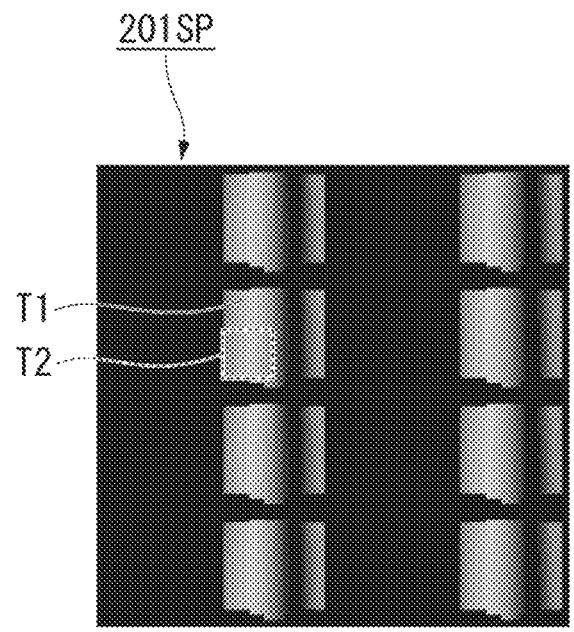
FIG. 9 shows the result of the transmittance simulation using a third voltage application pattern.
Figure 10:
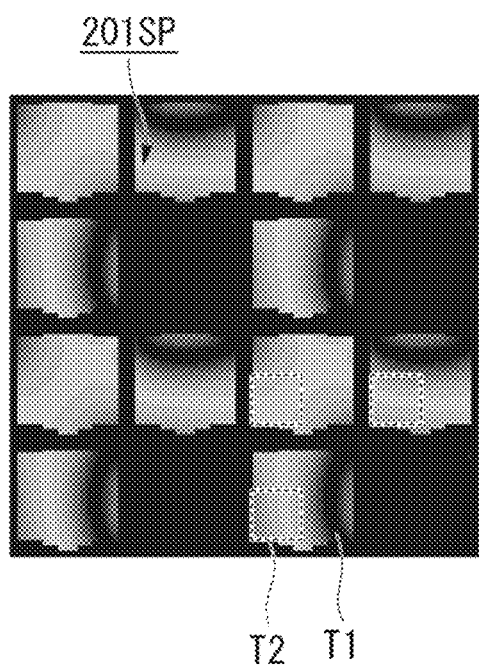
FIG. 10 shows the result of the transmittance simulation using a fourth voltage application pattern.

FIG. 7 shows the result of the transmittance simulation in a first voltage application pattern. FIG. 8 shows the result of the transmittance simulation in a second voltage application pattern. FIG. 9 shows the result of the transmittance simulation in a third voltage application pattern. FIG. 10 shows the result of the transmittance simulation in a fourth voltage application pattern. In FIGS. 7 to 10, the area displayed in white in the light transmissive area 205 of any of the sub-pixels 201SP is a high-transmission area T2 (second area), where the transmittance is relatively high. The area displayed in black in any of the sub-pixels 201SP is a low-transmission area T1 (first area), where the transmittance is relatively low.

The first voltage application pattern shown in FIG. 7 sets the states of 9 sub-pixels 201SP arranged around one sub-pixel 201SP in a matrix formed of 3 rows and 3 columns in such a way that the one center sub-pixel 201SP is turned on and the 8 peripheral sub-pixels 201SP are turned off.

The second voltage application pattern shown in FIG. 8 sets the states of 16 sub-pixels 201SP arranged in a matrix formed of 4 rows and 4 columns in such a way that in rows odd-numbered when counted from the above, the sub-pixels 201SP even-numbered when counted from the left are turned on and the sub-pixels 201SP odd-numbered when counted from the left are turned off, and in rows even-numbered when counted from the above, the sub-pixels 201SP odd-numbered when counted from the left are turned on and the sub-pixels 201SP even-numbered when counted from the left are turned off.

The third voltage application pattern shown in FIG. 9 sets the states of 16 sub-pixels 201SP arranged in a matrix formed of 4 rows and 4 columns in such a way that the sub-pixels 201SP in the even-numbered columns are turned on and the sub-pixels 201SP in the odd-numbered columns are turned off.

The fourth voltage application pattern shown in FIG. 10 sets the states of 16 sub-pixels 201SP arranged in a matrix formed of 4 rows and 4 columns in such a way that in each sets of four sub-pixels 201SP arranged in a matrix formed of two rows and two columns, the lower right sub-pixel 201SP is turned off and the remaining three sub-pixels 201SP are turned on.

As a condition common to the simulations shown in FIGS. 7 to 10, the light modulator includes a vertically oriented liquid crystal panel having a normally black mode in which sub-pixels 201SP to which off potential is supplied is displayed in black and sub-pixels 201SP to which on potential is supplied is displayed in white. It is further assumed that the sub-pixels 201SP each have a square shape, and that the pretilt direction of liquid crystal molecules 53B in the front view of the liquid crystal panel is the direction along the diagonal extending from the upper right corner to the lower left corner of the square that forms the contour of the sub-pixel 201SP as shown in the right portion of FIG. 7. The off potential is set at 0 V, and the on potential is set at 5 V.

In the case of the first voltage application pattern, the on-state central sub-pixel 201SP should ideally have an entirely white high-transmittance area, but twisted stripe-shaped black low-transmittance areas are created around a position slightly shifted obliquely rightward and upward from the center of the sub-pixel 201SP, as shown in FIG. 7.

In the case of the second voltage application pattern, the on-state sub-pixels 201SP each have a stripe-shaped black low-transmittance area extending from the upper right corner of the sub-pixel 201SP, as shown in FIG. 8.

In the case of the third voltage application pattern, the on-state sub-pixels 201SP each have a stripe-shaped, vertically extending black low-transmittance area, as shown in FIG. 9.

In the case of the fourth voltage application pattern, the sub-pixels 201SP horizontally and vertically adjacent to an off-state sub-pixel 201SP each have a stripe-shaped, curved black low-transmittance area, as shown in FIG. 10.

As described above, the simulations show in any of the voltage application patterns that disclination occurs in an on-state sub-pixel 201SP that should ideally have an entirely white high-transmittance area and therefore lowers transmittance. The simulations also show that the disclination is strongly affected by the potential at a sub-pixel 201SP adjacent to the sub-pixel 201SP where the disclination occurs, and that the shapes and positions of the high-transmittance area and the low-transmittance area in the sub-pixel where the disclination occurs extremely change in accordance with the potential at the adjacent sub-pixel 201SP. Which area in a sub pixel forms the high-transmittance area is determined by the pretilt direction of the liquid crystal molecules and the light incident direction in a vertically oriented liquid crystal panel. The "transmittance" in the present specification is not the transmittance provided by the liquid crystal panel alone but is the transmittance provided by the entire light modulator including the light-incident-side polarizer, the liquid crystal panel, and the light-exiting-side polarizer.

Overall examination of the results of the simulations shown in FIGS. 7 to 10, however, shows that the results of all the simulations are similar to one another in that the decrease the transmittance due to disclination is suppressed in the lower left quarter area of the sub-pixel 201SP where the disclination occurs and the transmittance in the area is higher than that in the other area, as shown in rectangular areas T2.

In view of the fact described above, the present inventor has conceived that a microlens array collects light in such a way that the collected light aims at the high-transmittance area in each sub-pixel that is the area common to the variety of voltage application patterns and causes the light to pass through the high-transmittance area to increase the light transmittance for a bight image irrespective of the voltage application pattern.

In the projector 1 according to the present embodiment, the center FC of the illumination light flux W on the light incident surface 74f of the superimposing lens 74 is not located in the optical axis 74a of the superimposing lens 74 but is located in a position shifted from the optical axis 74a of the superimposing lens 74, as shown in FIG. 3. Further, the light incident surface 74f of the superimposing lens 74 is optically conjugate with the black matrix BM of the liquid crystal panel 201 via the microlens array 54. The positional shift of the center FC of the illumination light flux W on the light incident surface 74f of the superimposing lens 74, that is, the positional shifts of the illumination light beams WR, WG1, WG2, and WE are therefore reflected as positional shifts in the sub-pixels 201R, 201G1, 201G2, and 201B of the liquid crystal panel 201, respectively.

The direction and distance of the positional shift of the center FC of the illumination light flux W may be so set that the illumination light beams WR, WG1, WG2, and WB are collected into spots in the lower left quarter area T2 in each of the sub-pixels 201SP in the case of the simulations shown in FIGS. 7 to 10.

As a prerequisite, the projector 1 according to the present embodiment needs to be so set that the illumination light beams WR, WG1, WG2, and WB are collected into spots at the centers of the sub-pixels 201R, 201G1, 201G2, and 201B provided that the center FC of the illumination light flux W is located in the optical axis 74a of the superimposing lens 74.

The black matrix BM has, as the light transmissive areas 205, the first light transmissive area 205r provided in correspondence with the first sub-pixel 201R, the second light transmissive area 205g1 provided in correspondence with the second sub-pixel 201G1, the third light transmissive area 205g2 provided in correspondence with the third sub-pixel 201G2, and the fourth light transmissive area 205b provided in correspondence with the fourth sub-pixel 201B, as shown in FIG. 4.

The lenses 541, which form the microlens array 54, collect the red illumination light beam WR incident along a predetermined direction into a spot in the high-transmittance area T2 of the first light transmissive area 205r, collect the first green illumination light beam WG1 incident along a direction different from the direction in which the red illumination light beam WR is incident into a spot in the high-transmittance area T2 of the second light transmissive area 205g1, collect the second green illumination light beam WG2 incident along a direction different from the directions in which the red illumination light beam WR and the first green illumination light beam WG1 are incident into a spot in the high-transmittance area T2 of the third light transmissive area 205g2, and collect the blue illumination light beam WB incident along a direction different from the directions in which the red illumination light beam WR, the first green illumination light beam WG1, and the second green illumination light beam WG2 are incident into a spot in the high-transmittance area T2 of the fourth light transmissive area 205b. The term "collect" used in the present specification means that the light is not necessarily focused into a single point in the high-transmittance area and may be defocused as long as the light as collected to some extent into a spot and at least passes through the high-transmittance area.

The high-transmittance areas 12 are located in the same position in the first light transmissive area 205r, the second light transmissive area 205g1, the third light transmissive area 205g2, and the fourth light transmissive area 205b. That is, when the pretilt direction of the liquid crystal molecules 53B is caused to coincide with the direction of the diagonal of each of the square sub-pixels 201SP when viewed along the direction of a normal to the liquid crystal panel 201, as shown in FIG. 7, the high-transmittance area T2 in each of the light transmissive areas 205r, 205g1, 205g2, and 205b is a corner area of the sub-pixel that is the corner area located at one end of the diagonal.

The present embodiment employs the configuration in which the entire optical axis of the light source apparatus 110 including the four light source units 111, 112, 113, and 114 shown in FIG. 2 is shifted from the optical axis 74a of the superimposing lens 74, as a specific method for shifting the center FC of the illumination light flux W from the optical axis 74a of the superimposing lens 74 on the light incident surface 74f of the superimposing lens 74. To this end, provided that the four light source units 111, 112, 113, and 114 are mounted, for example, on a common substrate, the substrate, to which the light source units 111, 112, 113, and 114 are attached, may be moved by a predetermined distance in a direction that intersects the optical axis 74a of the superimposing lens 74. According to the configuration described above, the illuminator 100 outputs the illumination light beams WR, WG1, WG2, and WB in such a way that the illumination light beams WR, WG1, WG2, and WE are collected into spots in the high-transmittance areas T2 in the sub-pixels 201R, 201G1, 201G2, and 201B of the liquid crystal panel 201.

Figure 6:
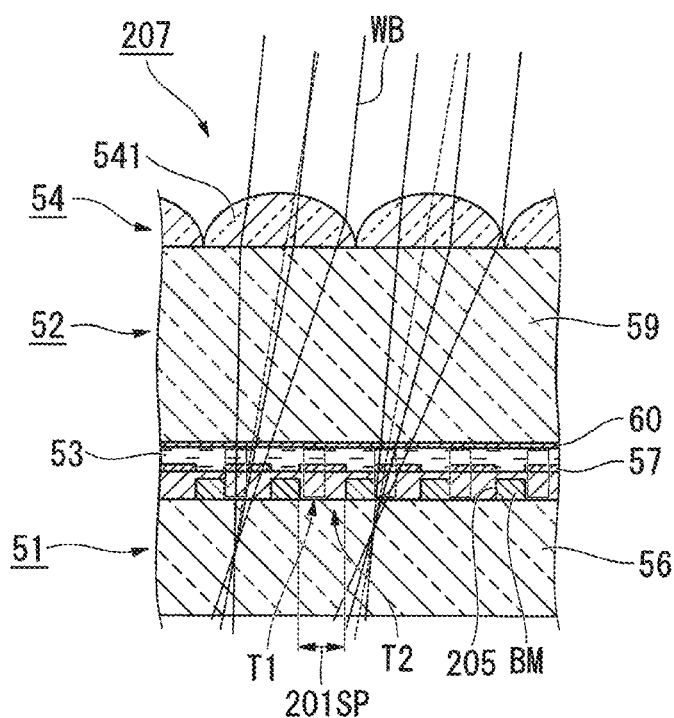
FIG. 6 is a cross-sectional view of a liquid crystal panel in Comparative Example.

FIG. 6 is a cross-sectional view of a liquid crystal panel 207 in a projector according to Comparative Example.

In FIG. 6, components common to those in FIG. 5 have the same reference characters. In FIG. 6, only the illumination light beam WB of the illumination light beams WR, WG1, WG2, and WB is shown for clarity of the figure.

In the projector according to Comparative Example, the center of the illumination light flux outputted from the light source apparatus is located in the optical axis of the superimposing lens. In the case of the projector according to Comparative Example, the illumination light beams WR, WG1, WG2, and WE are collected into spots at the centers of the sub-pixels 201R 201G1, 201G2, and 201B, respectively. In this case, part of the illumination light beam WB passes through the light transmissive areas 205 of the black matrix BM passing through the low-transmittance areas T1, as shown in FIG. 6. As a result, the brightness of an image decreases.

In contrast, in the projector 1 according to the present embodiment, the illumination light beams WR, WG1, WG2, and WB outputted from the illuminator 100 are not collected by the microlens array 54 provided in the light modulator 200 into spots at the centers of the sub-pixels 201R, 201G1, 201G2, and 201B but are collected into spots in the high-transmittance areas T2, for example, the lower left quarter areas of the sub-pixels 201SP shown in FIGS. 7 to 10. Therefore, in the present embodiment, the illumination light beam WB passes through the light transmissive areas 205 of the black matrix BM via the high-transmittance areas t2 while hardly passing through the low-transmittance areas T1, as shown in FIG. 5, unlike in Comparative Example shown in FIG. 6. As a result, the projector 1 according to the present embodiment can suppress a decrease in light transmittance resulting from disclination irrespective of the voltage application pattern in accordance with which the voltage is applied to the liquid crystal panel 201, that is, irrespective of the display pattern, whereby a bright image can be produced.

In the present embodiment, in particular, the projector 1, which is a single-panel projector including the spatially separate liquid crystal panel 201, is prone to disclination because different voltages are highly likely to be applied to sub-pixels of the liquid crystal panel 201 that are adjacent to each other. Employing the configuration in the present embodiment is therefore effective.

Further, since the high-transmittance areas T2 in the light transmissive areas 205 are located in the same position in all the sub-pixels 201R, 201G1, 201G2, and 201B, moving the entire light source apparatus 110 in a single direction allows the positions where the illumination light beams WR, WG1, WG2, and WB are collected to be moved to the high-transmittance areas T2 in the sub-pixels 201R, 201G1, 201G2, and 201B. The effect of the present embodiment can therefore be provided in a simple configuration. To achieve optimization on a color light basis in consideration of chromatic aberrations produced by the lenses in each section, the light source units 111, 112, 113, and 114, which output light beams having colors different from one another, may be moved by amounts different from one another.

Second Embodiment

A second embodiment of the present disclosure will be described below with reference to FIG. 11.

The configurations of a projector and an illuminator according to the second embodiment are the same as those in the first embodiment, but the second embodiment differs from the first embodiment in terms of the state of the collected illumination light beams at the liquid crystal panel. The projector and illuminator will therefore not entirely be described.

Figure 11:
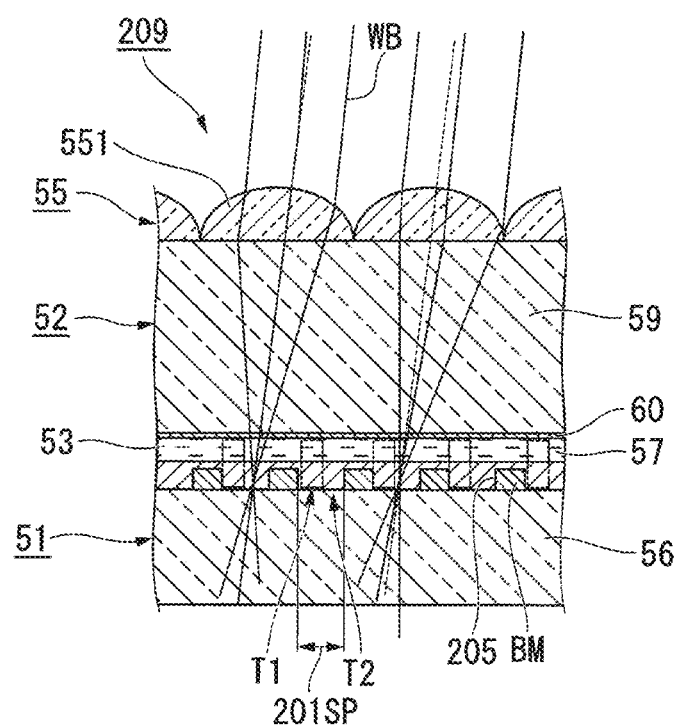
FIG. 11 is a cross-sectional view of a liquid crystal panel in a second embodiment.

FIG. 11 is a cross-sectional view of a liquid crystal panel 209 in the second embodiment.

In FIG. 11, components common to those in the figures used in the first embodiment have the same reference characters and will not be described.

In the first embodiment, each illumination light beam WB having passed through the corresponding lens 541 passes through the light transmissive area 205 of the black matrix BM and is then brought into focus in the translucent substrate 56 to form a substantially single collected point, as shown in FIG. 5. In contrast, in the present embodiment, the illumination light beam WB having passed through a corresponding lens 551, which forms a microlens array 55, is brought into focus in the position of the black matrix BM to form a substantially single collected point, as shown in FIG. 11. To this end, the power of the lenses 551 in the present embodiment differs from the power of the lenses 541 in the first embodiment.

The other configurations of the projector are the same as those in the first embodiment.

The present embodiment also provides the same effect provided by the first embodiment, for example, a decrease in light transmittance resulting from disclination can be suppressed irrespective of the voltage application pattern in accordance with which the voltage is applied to the liquid crystal panel 209, whereby a bright image can be displayed.

The present embodiment, in particular, in which the illumination light beam WB is collected into the smallest spot in the position of the black matrix BM, readily achieves the configuration in which the illumination light beam WB does not pass through the low-transmittance areas T1 resulting from the disclination and is not blocked by the black matrix BM but passes through the light transmissive areas 205. The configuration in the present embodiment can therefore more effectively suppress a decrease in light transmittance due to disclination as compared with the suppression achieved in the first embodiment, whereby a bright image can be produced.

Third Embodiment

A third embodiment of the present disclosure will be described below with reference to FIGS. 12 to 14.

The configuration of a projector according to the third embodiment is the same as that in the first embodiment, but the third embodiment differs from the first embodiment in terms of the configuration of the light source apparatus. The projector will therefore not be described.

Figure 12:
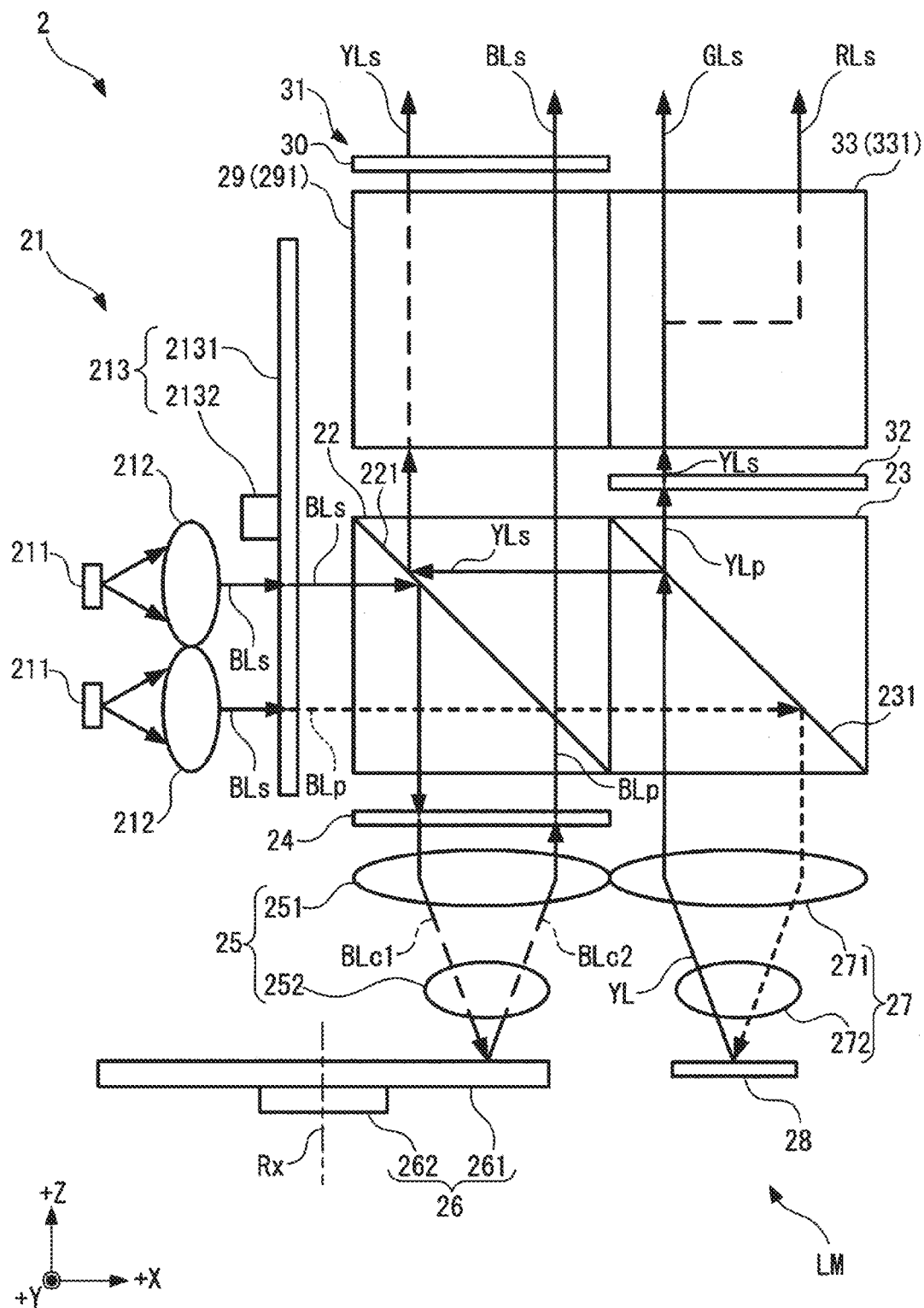
FIG. 12 is a schematic configuration diagram of a light source apparatus in a third embodiment.

FIG. 12 is a schematic configuration diagram of a light source apparatus 2 in the third embodiment and is a plan view of the light source apparatus 2 viewed along the direction +Y. FIG. 13 is a side view of the light source apparatus 2 viewed from one side. FIG. 14 is a side view of the light source apparatus 2 viewed from the other side.

The light source apparatus 2 in the present embodiment outputs a plurality of spatially separate color light beams. In the present embodiment, the illumination light beams outputted by the light source apparatus 2 are each S-polarized light and are formed of spatially separate blue light BLs, yellow light YLs, green light GLs, and red light RLs.

Figure 13:
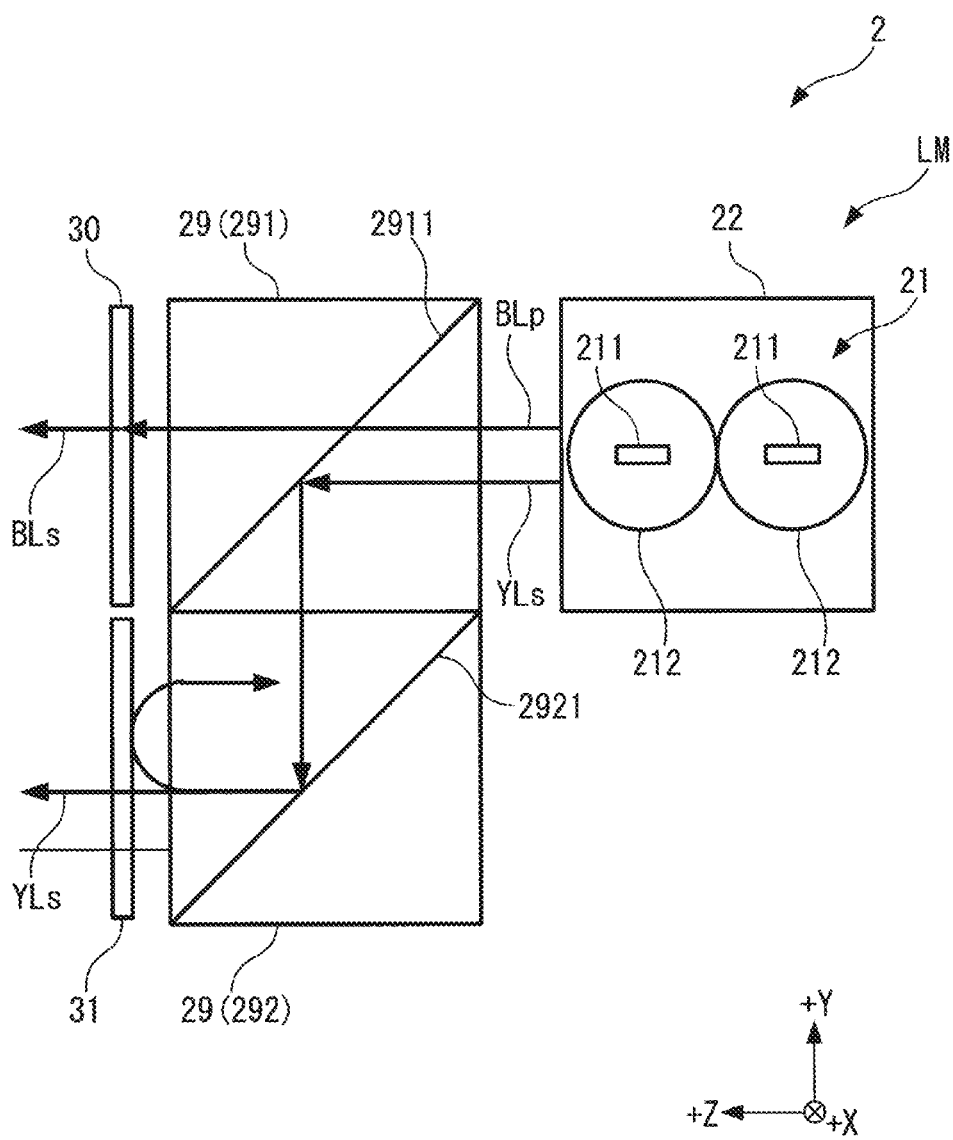
FIG. 13 is a side view of the light source apparatus viewed from one side.
Figure 14:
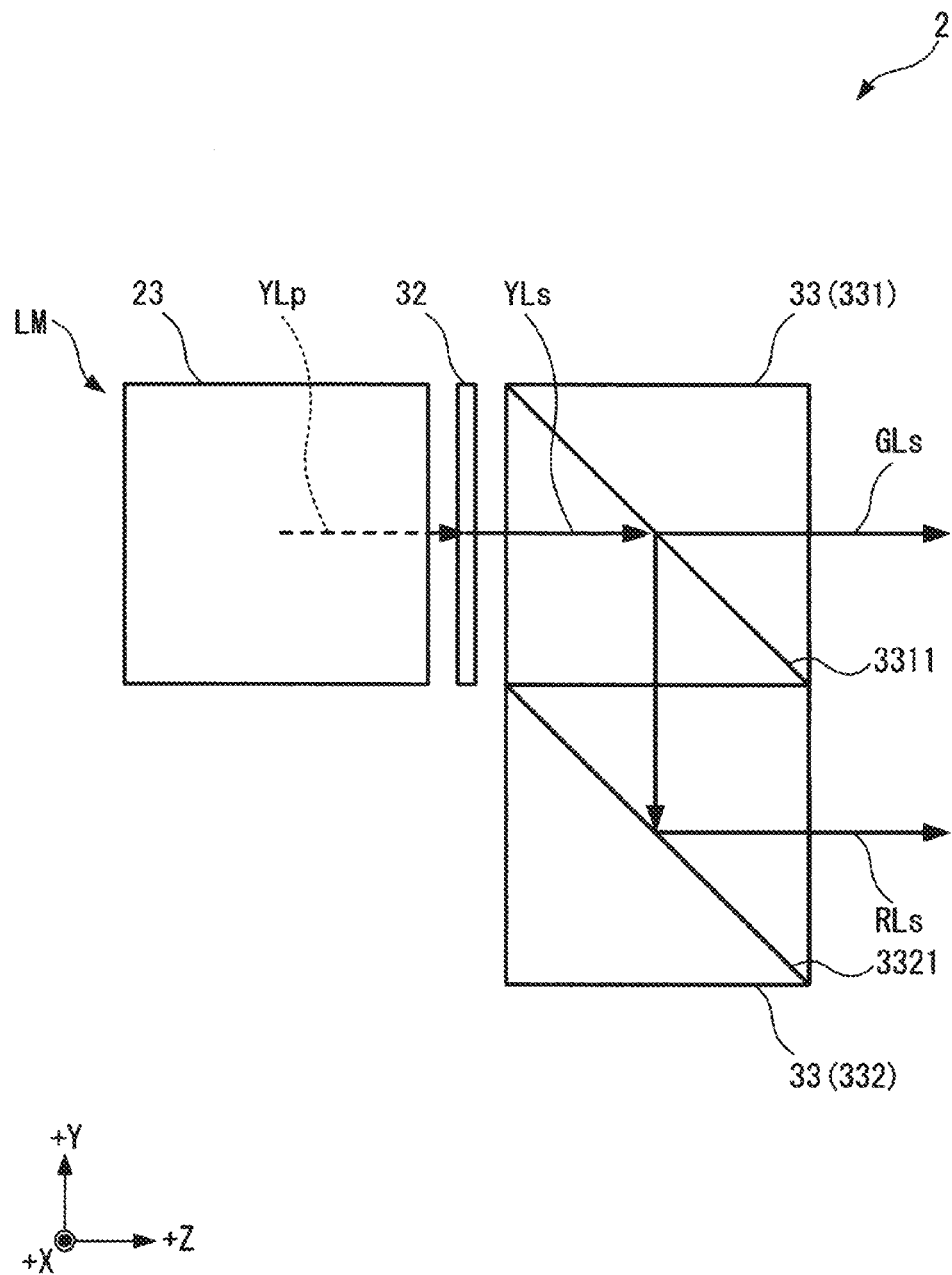
FIG. 14 is a side view of the light source apparatus viewed from the other side.

The light source apparatus 2 includes a light source section 21, a first polarization separator 22, a second polarization separator 23, a first phase retarder 24, a first light collector 25, a first reflector 26, a second light collector 27, a wavelength converter 28, a first color separator 29, a second phase retarder 30, a second reflector 31, a third phase retarder 32, and a second color separator 33, as shown in FIGS. 12 to 14.

Configuration of Light Source Section

The light source section 21 outputs light that enters the first polarization separator 22 along the direction +X. The light source section 21 includes light sources 211, collimator lenses 212, and a rotary retardation apparatus 213. The light sources 211 are each a solid-state light source that outputs blue light. In detail, the light sources 211 are each a semiconductor layer that outputs S-polarized blue light BLs. The blue light BLs is laser light having a peak wavelength ranging, for example, from 450 to 460 nm. The collimator lenses 212 parallelize the blue light BLs outputted from the light sources 211.

The rotary retardation apparatus 213 includes a phase retarder 2131 and a rotator 2132, which rotates the phase retarder 2131 around an axis of rotation parallel to the direction +X. The phase retarder 2131 is formed of a half wave plate or a quarter wave plate. Part of the S-polarized blue light his having entered the phase retarder 2131 is converted by the phase retarder 2131 into P-polarized blue light BLp. The blue light having passed through the phase retarder 2131 is therefore the mixture of the S-polarized blue light his and the P-polarized blue light BLp mixed at a predetermined ratio. The rotator 2132 adjusts the angle of rotation of the phase retarder 2131 to adjust the ratio between the blue light BLs and the blue light BLp contained in the blue light that passes through the phase retarder 2131. The rotator 2132, which rotates the phase retarder 2131, may be omitted.

The light source section 21 thus outputs the S-polarized blue light BLs and the P-polarized blue light BLp. The light sources 211 are each configured to output the polarized blue light BLs and may instead be each configured to output the S-polarized blue light BLs and the P-polarized blue light BLp. In this case, the rotary phase retardation apparatus 213 can be omitted. Further, the light sources 211 do not necessarily each include a semiconductor laser and may include another type of solid-state light source, such as an LED.

Configuration of First Polarization Separator

The blue light BLs and the blue light BLp enter the first polarization separator 22 along the direction +X. The first polarization separator 22 is a prism-shaped polarization separator formed by combining two prism pieces each being a substantially right-angled isosceles triangular column with each other into a substantially box-like shape, and the polarization separation layer 221 is provided at the interface between the two prism pieces. The polarization separation layer 221 inclines by 45° with respect to the directions +X and +Z.

The polarization separation layer 221 has a polarization separation characteristic that causes the polarization separation layer 221 to transmit a portion of the light incident thereon that is the portion formed of P-polarized light and reflect a portion of the incident light that is the portion formed of S-polarized light. The polarization separation layer 221 transmits P-polarized light and reflect S-polarized light when the light incident on the polarization separation layer 221 is the blue light. The polarization separation layer 221 has a wavelength selective polarization separation characteristic that causes the polarization separation layer 221 to reflect the light incident thereon irrespective of the polarization state of the light when the incident light has a wavelength longer than the wavelength of the blue light. The first polarization separator 22 therefore transmits the P-polarized blue light BLp out of the blue light incident on the first polarization separator 22 in such a way that the transmitted P-polarized blue light BLp travels in the direction +X and reflects the S-polarized blue light BLs out of the incident blue light in such a way that the reflected S-polarized blue light BLs travels in the direction −Z. The first polarization separator 22 is not limited to a prism-shaped polarization separator and may instead be a plate-shaped polarization separator including the polarization separation layer 221.

Configuration of Second Polarization Separator

The second polarization separator 23 is located in a position shifted in the direction +X from the first polarization separator 22, and the blue light BLp having passed through the first polarization separator 22 enters the second polarization separator 23. The second polarization separator 23 is a prism-shaped polarization separator, as is the first polarization separator 22, and includes a polarization separation layer 231 provided at the interface between the two prism pieces. The polarization separation layer 231 inclines by 45° with respect to the directions +X and +Z. The polarization separation layer 231 is parallel to the polarization separation layer 221.

The polarization separation layer 231 has a wavelength selective polarization separation characteristic that causes the polarization separation layer 231 to reflect blue light, reflect the S-polarized component of light having wavelengths longer than the wavelength of the blue light, and transmit P-polarized component thereof. The second polarization separator 23 therefore reflects the blue light BLp incident from the first polarization separator 22 in such a way that the reflected blue light BLp travels in the direction −Z. The second polarization separator 23 is not limited to a prism-shaped polarization separator and may instead be a plate-shaped polarization separator including the polarization separation layer 231.

Configuration of First Phase Retarder

The first phase retarder 24 is located in a position shifted in the direction from the first polarization separator 22. That is, the first phase retarder 24 is located between the first polarization separator 22 and the first reflector 26 in the direction −Z. The first phase retarder 24 is a quarter wave plate and converts the blue light BLs reflected off the first polarization separator 22 into circularly polarized blue light BLc1, which then enters the first light collector 25. That is, the first phase retarder 24 converts the polarization component of the blue light incident thereon.

Configuration of First Light Collector

The first light collector 25 is located in a position shifted in the direction −Z from the first phase retarder 24. That is, the first light collector 25 is located between the first phase retarder 24 and the first reflector 26 in the direction −Z. The first light collector 25 collects the blue light BLc1 incident from the first phase retarder 24 into a spot on the first reflector 26. The first light collector 25 parallelizes blue light Blc2 incident from the first reflector 26. In the example shown in FIG. 12, the first light collector 25 is formed of two lenses 251 and 252, but the number of lenses that form the first light collector 25 is not limited to a specific number.

Configuration of First Reflector

The first reflector 26 is located in a position shifted in the direction −Z from the first light collector 25. The first reflector 26 diffusively reflects in the direction +Z the blue light. BLc1 incident in the direction −Z from the first light collector 25 at the same angle of diffusion as that of yellow light YL outputted from the wavelength converter 28, which will be described later. The first reflector 26 includes a reflection plate 261, which has a reflection characteristics close to the Lambert reflection characteristic and reflects the blue light BLc1 incident on the reflection plate 261, and a rotator 262, which rotates the reflection plate 261 around an axis of rotation Rx parallel to the direction +Z.

The blue light BLc1 incident on the reflection plate 261 is converted, when reflected off the reflection plate 261, into the blue light BLc2, which is circularly polarized light having a polarization rotation direction opposite the polarization rotation direction of the incident blue light BLc1. The blue light Blc2 outputted from the first reflector 26 passes in the direction +Z through the first tight collector 25 and then enters the first phase retarder 24 again. The blue light BLc2 that enters the first phase retarder 24 from the first light collector 25 is therefore converted by the first phase retarder 24 into the P-polarized blue light BLp. The converted blue light BLp passes through the first polarization separator 22 in the direction +Z and enters the first color separator 29.

Configuration of Second Light Collector

The second light collector 27 is located in a position shifted in the direction −Z from the second polarization separator 23. That is, the second light collector 27 is located between the second polarization separator 23 and the wavelength converter 28 in the direction −Z. The second light collector 27 collects the blue light BLp reflected off the second polarization separator 23 into a spot on the wavelength converter 28. The second light collector 27 parallelizes the yellow light YL, that enters the second polarization separator 23 from the wavelength converter 28. In the example shown in FIG. 12, the second light collector 27 is formed of two lenses 271 and 272, but the number of lenses that form the second light collector 27 is not limited to a specific number.

Configuration of Wavelength Converter

The wavelength converter 28 is located in a position shifted in the direction −Z from the second light collector 27. The wavelength converter 28 is a reflective wavelength converter that is excited with light incident thereon and outputs light having a wavelength different from the wavelength of the incident light in the direction opposite the direction in which the incident light travels. In other words, the wavelength converter 28 is a reflective wavelength converter that converts the wavelength of the incident light and outputs the converted light in the direction opposite the direction in which the incident light travels.

In the present embodiment, the wavelength converter 28 contains a yellow phosphor that is excited with blue light and emits yellow light. The wavelength converter 28 outputs in the direction +Z the nonpolarized yellow light YL, which is fluorescence having a wavelength longer than the wavelength of the blue light BLp, which is excitation light incident along the direction −Z. The yellow light YL has a peak wavelength ranging, for example, from 500 to 700 nm. That is, the yellow light YL contains a green light component and a red light component, and the components are each a mixture of S-polarized light and P-polarized light. The yellow light YL outputted from the wavelength converter 28 is parallelized by the second light collector 27 along the direction +Z, and the parallelized yellow light YL enters the second polarization separator 23. The light source apparatus 2 may include a rotator that rotates the wavelength converter 28 around an axis of rotation parallel to the direction +Z. In this case, the heat dissipation efficiency of the wavelength converter 28 can be increased.

The polarization separation layer 231 of the second polarization separator 23 has the aforementioned wavelength selective polarization separation characteristic. Therefore, out of the nonpolarized yellow light YL incident on the polarization separation layer 231, the S-polarized yellow light YLs is reflected off the polarization separation layer 231 in the direction −X and enters the first polarization separator 22. The polarization separation layer 221 of the first polarization separator 22 has the polarization separation characteristic that causes the polarization separation layer 221 to reflect the S-polarized yellow light YLs, as described above. The yellow light YLs incident on the polarization separation layer 221 in the direction −X is therefore reflected off the first polarization separator 22 in the direction +Z and enters the first color separator 29. On the other hand, out of the nonpolarized yellow light YL incident on the polarization separation layer 231, P-polarized yellow light YLp passes through the polarization separation layer 231 in the direction +Z and enters the third phase retarder 32.

Configuration of First Color Separator

FIG. 13 is a side view of the light source apparatus 2 viewed along the direction −X. In other words, FIG. 13 is a diagrammatic view of the first color separator 29, the second phase retarder 30, and the second reflector 31 viewed along the direction −X. In FIG. 13, the rotary retardation apparatus 213, the first phase retarder 24, the first light collector 25, and the first reflector 26 are omitted.

The first color separator 29 is located in a position shifted in the direction +Z from the first polarization separator 22 and separates the light having exited in the direction +Z out of the first polarization separator 22 into the blue light and the yellow light. The first color separator 29 includes a dichroic prism 291 and a reflection prism 292, as shown in FIG. 13.

The light having exited out of the first polarization separator 22 enters the dichroic prism 291. The dichroic prism 291 is a prism-shaped color separator formed by combining two prism pieces each being a substantially right-angled isosceles triangular column with each other into a substantially box-like shape, and a color separation layer 2911 is provided at the interface between the two prism pieces.

The color separation layer 2911 inclines by 45° with respect to the directions +Y and +Z. The color separation layer 2911 transmits the blue light out of the incident light in the direction +Z and reflects color light having a wavelength longer than the wavelength of the blue light out of the incident light in the direction −Y. Therefore, out of the light that enters the dichroic prism 291 from the first polarization separator 22, the blue light BLp passes through the color separation layer 2911 in the direction +Z and exits out of the dichroic prism 291. On the other hand, out of the light that enters the dichroic prism 291 from the first polarization separator 22, the yellow light YLs is reflected off the color separation layer 2911 in the direction −Y. The dichroic prism 291 may be replaced with a dichroic mirror including the color separation layer 2911. The first color separator 29 may include a polarization separator having a polarization separation layer and the reflection prism 292.

The reflection prism 292 is located in a position shifted in the direction −Y from the dichroic prism 291. The yellow light YLs reflected off the color separation layer 2911 enters the reflection prims 292. The reflection prism 292 is a prism-shaped reflector formed by combining two prism pieces each being a substantially right-angled isosceles triangular column with each other into a substantially box-like shape, and a reflection layer 2921 is provided at the interface between the two prism pieces.

The reflection layer 2921 inclines by 45' with respect to the directions +Y and +Z. The reflection layer 2921 is parallel to the color separation layer 2911. The reflection layer 2921 reflects the yellow light YLs incident from the dichroic prism 291 in the direction −Y in such a way that the reflected yellow light YLs travels in the direction +Z. The yellow light YLs reflected off the reflection layer 2921 exits in the direction +Z out of the reflection prism 292. The reflection prism 292 may be replaced with a reflection mirror including the reflection layer 2921.

Configuration of Second Phase Retarder

The second phase retarder 30 is disposed in a position shifted in the direction +Z from the dichroic prism 291 and located in the optical path of the blue light BLp having exited out of the dichroic prism 291. The second phase retarder 30 is a half wave plate that converts the polarization direction of the light incident thereon and converts the blue light BLp incident from the dichroic prism 291 into the S-polarized blue light BLs. The converted S-polarized blue light BLs from the second phase retarder 30 exits out of the light source apparatus 2 in the direction +Z. The second phase retarder 30 may instead be provided at a surface of the dichroic prism 291 that is the surface via which the blue light BLp exits.

Configuration of Second Reflector

The second reflector 31 is disposed in a position shifted in the direction +Z from the reflection prism 292 and provided in the optical path of the yellow light YLs having exited out of the reflection prism 292. The second reflector 31 transmits part of the light incident thereon and reflects the remainder. Therefore, out of the yellow light YLs incident on the second reflector 31 part of the yellow light YLs passes through the second reflector 31 and exits out of the light source apparatus 2 in the direction +Z. That is, the yellow light YLs is spatially separated from the blue light BLs and exits via a light exiting position on the light source apparatus 2 that is the position different from the light exiting position via which the blue light BLs exits.

On the other hand, the remainder of the yellow light YLs incident on the second reflector 31 is reflected off the second reflector 31 and enters the reflection prism 292 again. The remainder of the yellow light YLs having entered the reflection prism 292 is reflected off the reflection layer 2921 in the direction +Y and incident on the wavelength converter 28 via the dichroic prism 291, the first polarization separator 22, the second polarization separator 23, and the second light collector 27.

The yellow phosphor contained in the wavelength converter 28 hardly absorbs yellow light externally incident thereon. The yellow light YLs incident on the wavelength converter 28 is therefore repeatedly reflected in the wavelength converter 28 to form nonpolarized yellow light YL, which exits out of the wavelength converter 28 along with the yellow light YL produced in the yellow phosphor. The yellow light YL outputted from the wavelength converter 28 then enters the second polarization separator 23 via the second light collector 27, as described above. The ratio between the amount of yellow light YLs passing through the second reflector 31 and the amount of yellow light YLs reflected off the second reflector 31 can be set in advance. The second reflector 31 may instead be provided at a surface of the reflection prism 292 that is the surface via which the yellow light YLs exits.

Configuration of Third Phase Retarder

FIG. 14 is a side view of the light source apparatus 2 viewed along the direction +X. In other words, FIG. 14 is a diagrammatic views of the third phase retarder and the second color separator 33 viewed along the direction +X. In FIG. 14, the second light collector 27 and the wavelength converter 28 are omitted.

The third phase retarder 32 is located in a position shifted in the direction +Z from the second polarization separator 23, as shown in FIGS. 12 and 14. The yellow light YLp having passed through the second polarization separator 23 enters the third phase retarder 32. The third phase retarder 32 is a half wave plate and converts the yellow light YLp into the S-polarized yellow light YLs. The converted S-polarized yellow light YLs enters the second color separator 33.

Configuration of Second Color Separator

The second color separator 33 is located in a position shifted in the direction +Z from the third phase retarder 32. The second color separator 33 separates the yellow light YLs having exited out of the second polarization separator 23 in the direction +Z and converted by the third phase retarder 32 into the S-polarized light into the green light component and the red light component. The second color separator 33 includes a dichroic prism 331 and a reflection prism 332, as shown in FIG. 14.

The dichroic prism 331 is a prism-shaped color separator, as is the dichroic prism 291, and a color separation layer 3311 is provided at the interface between the two prism pieces. The color separation layer 3311 inclines by 45° with respect to the directions +Y and +Z. The color separation layer 3311 is parallel to the color separation layer 2911 and the reflection layer 2921. The color separation layer 3311 transmits the green light component out of the incident light in such a way that the transmitted green light component travels in the direction +Z and reflects the red light component in such a way that the reflected red light component travels in the direction −Y. Therefore, out of the yellow light YLs having entered the dichroic prism 331, the green light GLs, which is the S-polarized green light component, passes through the color separation layer 3311 in the direction +Z and exits out of the dichroic prism 331. The green light GLs exits out of the light source apparatus 2 in the direction +Z. That is, the green light GLs is spatially separated from the blue light BLs and the yellow light YLs and exits via a light exiting position on the light source apparatus 2 that is the position different from the light exiting positions via which the blue light BLs and the yellow light YLs exit.

On the other hand, out of the yellow light YLs having entered the dichroic prism 331, the red light RLs, which is the S-polarized red light component, is reflected off the color separation layer 3311 in the direction −Y. The dichroic prism 331 may be replaced with a dichroic mirror including the color separation layer 3311.

The reflection prism 332 has the same configuration as that of the reflection prism 292. That is, the reflection prism 332 includes a reflection layer 3321 parallel to the color separation layers 2911 and 3311 and the reflection layer 2921. The reflection layer 3321 reflects the red light RLs reflected off the color separation layer 3311 and incident on the reflection layer 3321 in such a way that the reflected red light. RLs travels in the direction +Z. The red light RLs reflected off the reflection layer 3321 exits out of the reflection prism 332. The red light RLs exits out of the light source apparatus 2 in the direction +Z. That is, the red light RLs is spatially separated from the blue light BLs, the yellow light YLs, and the green light GLs and exits via a light exiting position on the light source apparatus that is the position different from the light exiting positions via which the blue light BLs, the yellow light YLs, and the green light GLs exit.

As described above, the light source apparatus 2 in the present embodiment outputs the red light RLs, the blue light BLs, the yellow light YLs, and the green light GLs as four light fluxes arranged in a matrix formed of two rows and two columns when viewed along the direction of the optical axis of the light source apparatus 2. Further, also in the present embodiment, the lens integrator unit 70, the polarization converter 73, and the superimposing lens 74 are provided on the downstream of the light source apparatus 2, as in the first embodiment shown in FIG. 2. The red light RLs, the blue light BLs, the yellow light YLs, and the green light GLs can therefore be collected into spots in the high-transmittance areas of the sub-pixels of the liquid crystal panel by placing the light source apparatus 2 in such a way that the optical axis of the light source apparatus 2 is shifted from the optical axis of the superimposing lens 74.

The present embodiment also provides the same effect provided by the first embodiment, for example, a decrease in light transmittance resulting from disclination can be suppressed irrespective of the voltage application pattern in accordance with which the voltage is applied to the liquid crystal panel, whereby a bright image can be displayed.

Further, the present embodiment allows the blue light BLp and the yellow light YLs to exit from the first polarization separator 22 and the yellow light YLp to exit from the second polarization separator 23. The light source apparatus 2 can therefore be so achieved in a simple configuration as to be capable of outputting a plurality of color light beams having the same polarization direction and spatially separate from one another.

The technical range of the present disclosure is not limited to those in the embodiments described above, and a variety of changes can be made to the embodiments to the extent that the changes do not depart from the substance of the present disclosure.

For example, in the embodiments described above, to shift the center of the light flux that enters the superimposing lens from the optical axis of the superimposing lens, the configuration in which the optical axis of the light source apparatus is shifted from the optical axis of the superimposing lens has been employed. In place of the configuration described above, an optical element that changes the position where or the angle at which the light enters the superimposing lens may be provided between the light source apparatus and the superimposing lens.

The aforementioned embodiments have been described with reference to the case where the projector according to the present disclosure is a single-panel projector including a spatially separate liquid crystal panel. The projector according to the present disclosure may instead be a projector including three liquid crystal panels that modulate blue light, green light, and red light, respectively. In this case, the minimum display unit in each of the liquid crystal panels is not a sub-pixel but is a pixel. Therefore, to apply the present disclosure to a projector of this type, each pixel corresponds to the display unit in the appended claims.

In addition to the above, the shape, the number, the arrangement, the material, and other specific descriptions of the components of the projector are not limited to those in the embodiments described above and can be changed as appropriate.

What is claimed is:

1. A projector comprising:
an illuminator that outputs light;
a light modulator including a liquid crystal panel that modulates the light from the illuminator in accordance with image information; and
a projection optical apparatus that projects image light modulated by the light modulator,
the liquid crystal panel includes a display unit on which the light from the illuminator is incident, a light blocking film having a light, transmissive area provided in correspondence with the display unit, and a lens that collects the light into a spot in the light transmissive area,
the display unit has a first area and a second area in the light transmissive area, the second area providing light transmittance higher than light transmittance provided by the first area,
the illuminator outputs the light in such a way that the lens collects the light into a spot in the second area,
wherein the liquid crystal panel has as the display unit at least a first display unit on which first light that belongs to a first wavelength band is incident and a second display unit which is so disposed as to be adjacent to the first display unit and on which second light that belongs to a second wavelength band different from the first wavelength band is incident,
the light blocking film has as the light transmissive area at least a first light transmissive area provided in correspondence with the first display unit and a second light transmissive area provided in correspondence with the second display unit, and
the lens collects the first light incident in a predetermined direction into a spot in the second area in the first light transmissive area and the second light incident in a direction different from the direction in which the first light is incident into a spot in the second area in the second light transmissive area.

2. The projector according to claim 1, wherein the second area in the first light transmissive area and the second area in the second light transmissive area are located in the same position in the light transmissive areas to which the second areas correspond.

3. The projector according to claim 2,
wherein a pretilt direction of liquid crystal molecules in the liquid crystal panel substantially coincides with a direction of a diagonal of the display unit having a rectangular shape when viewed in a direction of a normal to the liquid crystal panel, and
the second area in each of the light transmissive areas is located at one end of the diagonal.

4. The projector according to claim 1,
wherein the illuminator includes a light source apparatus, a first lens array on which light from the light source apparatus is incident, a second lens array on which light from the first lens array is incident, and a superimposing lens on which light from the second lens array is incident, and
a center of an illumination light flux incident on the superimposing lens is shifted from an optical axis of the superimposing lens.

5. The projector according to claim 4, wherein an optical axis of the light source apparatus is shifted from the optical axis of the superimposing lens.

6. The projector according to claim 4, wherein an optical element that changes a position where or an angle at which the light is incident on the superimposing lens is provided between the light source apparatus and the superimposing lens.

\* \* \* \* \*